United States Patent [19]
Watanabe

[11] Patent Number: 5,601,298
[45] Date of Patent: Feb. 11, 1997

[54] WHEELBARROW

[75] Inventor: Yoshihisa Watanabe, Mie, Japan

[73] Assignee: Suntool Co., Ltd., Mie, Japan

[21] Appl. No.: 529,554

[22] Filed: Sep. 18, 1995

[30]     Foreign Application Priority Data

Jun. 28, 1995 [JP] Japan .................. 7-006478 U

[51] Int. Cl.⁶ ................................... B62B 1/10
[52] U.S. Cl. ............................. 280/47.31; 298/3
[58] Field of Search ................. 280/47.17, 47.3,
            280/47.31, 47.26, 47.24, 47.32, 47.33; 298/2, 3

[56]         References Cited

U.S. PATENT DOCUMENTS

| | | | |
|---|---|---|---|
| 3,173,705 | 3/1965 | DuPuy | 280/47.31 |
| 3,235,281 | 2/1966 | Faucette, Jr. | 280/47.31 |
| 4,758,010 | 7/1988 | Christie | 280/47.31 |
| 5,149,116 | 9/1992 | Donze et al. | 280/47.31 |
| 5,153,966 | 10/1992 | Godwin | 280/47.31 |

*Primary Examiner*—Richard M. Camby
*Attorney, Agent, or Firm*—Lorusso & Loud

[57]         ABSTRACT

An improved wheelbarrow is disclosed, comprising a wheel, a tray, a pair of handles, and a front guard, the improvement being in the handles and the front guard, in that each handle is provided with a roundish handlegrip including a first grip, round grip portion and second grip to facilitate an easier and safer forward dumping of load without switching handgrips, and in that the front guard facilitates a stabler forward dumping of load. The front guard may comprise at least one bar portion in parallel to the wheel axis or a curved plate. The front guard may alternatively comprise a pair of bar portions extending along the circumference of the wheel.

2 Claims, 11 Drawing Sheets

WHEELBARROW

BACKGROUND OF THE INVENTION

1. Field of the Invention

This invention generally relates to a wheelbarrow. More particularly, this invention relates to a wheelbarrow which facilitates a safer and easier forward dumping of load.

2. Description of the Prior Art

A wheelbarrow generally includes a wheel, a tray, a pair of legs, and a pair of handles.

A worker holds the handles of a wheelbarrow by the handlegrips with his palms facing downward (his arms are stretched downward), and pushes the wheelbarrow forward to carry the load in the tray. The worker wishing to dump the Load forward gradually lifts the handlegrips keeping the wheelbarrow in balance so that the tail of the wheelbarrow or the tray is lifted and the wheelbarrow stands head down on its front wheel guard or wheel.

During the lifting of the handlegrips or handles, the worker is required to change his handgrips from palm-down position to palm-up position, or he needs to change his hold of the handlegrips from the upper-side holding to the lower-side holding of the handlegrips so that he can push the handles forward when the handles are half lifted. In order to switch his handgrips without throwing the wheelbarrow off balance, the worker needs to be extra careful since it is generally required to momentarily leave his hands one after the other from the handlegrips during a forward dumping operation.

To completely dump the load in the tray forward, the worker is often required to shake and vibrate or rock the wheelbarrow back and forth with the wheelbarrow in a head-down position.

During such a forward dumping operation, the wheelbarrow often loses its balance, especially when the load is heavy and/or the worker is not strong enough or skilled enough. It is not only time wasting but also dangerous if a wheelbarrow accidentally topples with its heavy load. And trying to hold a wheelbarrow in balance during forward dumping operations is sometimes very tough.

Accordingly, it is an object of the present invention to provide a wheelbarrow which can facilitate a safer and easier forward dumping.

SUMMARY OF THE INVENTION

A wheelbarrow of the present invention includes a wheel, a tray, a pair of legs, and a pair of handles, further including an improved wheel guard or front guard provided in front of the wheel, which includes a horizontal bar as an embodiment. The "horizontal" direction is the direction parallel to the ground or the wheel axis. When the handles of the wheelbarrow are lifted, the wheelbarrow will come to a stand-up or tail-up position with its head down on the horizontal bar of the front guard which contacts a length of the ground, the wheelbarrow being held in balance with a worker's hands, and the sideway swaying of the wheelbarrow will effectively be prevented.

The front guard may alternatively comprise two parallel horizontal bars so that the wheelbarrow can keep stabler when the wheelbarrow stands head down on the front guard. Such a front guard may still alternatively comprise a curved plate such that the wheelbarrow can rock on the curved plate back and forth more smoothly.

The front guard may yet alternatively comprise a pair of bent bars on both sides of the wheel which extend downwardly along the circumference of the wheel so that the wheelbarrow can rock back and forth on the front guard smoothly and stably while resisting sideway inclination.

There can be a number of other modifications to the front guard in accordance with the teaching of the present invention, which aims at providing a stabler forward dumping of load compared with any prior art wheelbarrow.

In order to facilitate a still easier and safer forward dumping of load, those wheelbarrows having a front guard of the present invention may also be provided with a pair of handles each including a rounded or roundish handlegrip. A roundish handlegrip comprises a main or first grip, sub. or second grip, round grip portion connecting the first grip and the second grip, and stopper.

The second grip is provided below the first grip, both first grip and second grip connected with the round grip portion. A worker slides his hands rearward on the first grips as he lifts the handles and holds the second grips without ever leaving or "switching" his handgrips. A wheelbarrow with rounded or roundish handgrips facilitates safer and easier forward dumping of load compared with a wheelbarrow having just a front guard of the present invention.

DETAILED DESCRIPTION OF THE EMBODIMENT

Figure 1:
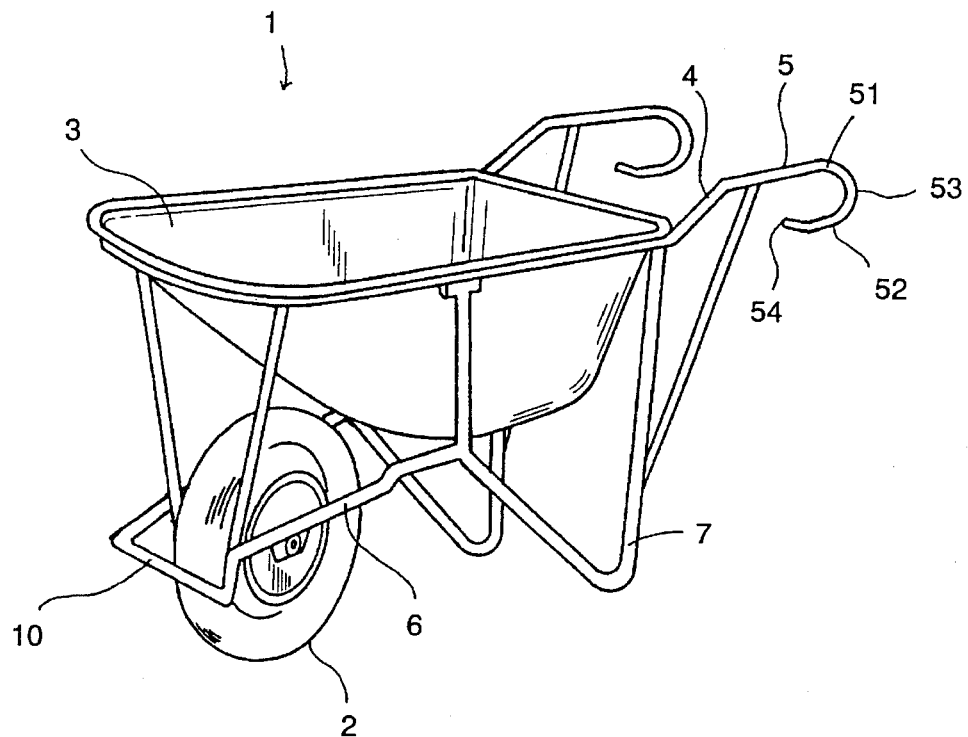
FIG. 1 is a perspective view of a wheelbarrow according to an embodiment of the present invention.

In FIG. 1, a wheelbarrow 1 according to an embodiment of the present invention is shown. The wheelbarrow 1 comprises a wheel 2, a pair of wheel bars 6, a front guard 10, a tray 3, a pair of legs, and a pair of handles 4 each comprising a rounded handlegrip 5 having a first grip 51, second grip 52, round grip portion 53 and stopper 54.

The pair of wheel bars 6 support the wheel axis (not shown) and also support the front guard 10 in front of the wheel 2, which, in this embodiment, includes a horizontal bar. Here, the "horizontal" direction is the direction which is parallel to the ground or to the wheel axis. The legs 7 keep the wheelbarrow 1 at its rest position. A user or worker of this wheelbarrow 1 will dump the load (not shown) in the tray 3 forward by lifting the handles 4 with his hands (shown in FIGS. 2(a) and 2(b)) so that the wheelbarrow 1 stands head down on the front guard 10 as shown in FIGS. 2(a) and 2(b).

Figure 2A:
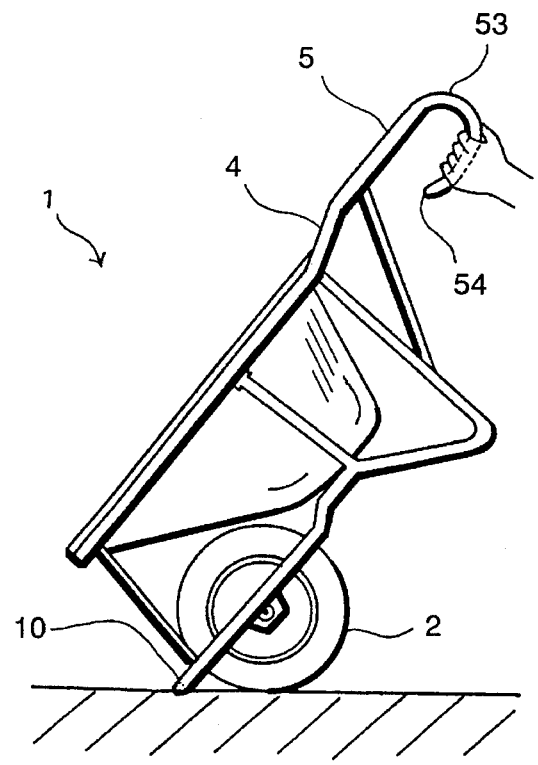
FIGS. 2(a) and 2(b) are side elevational views showing the work of the front guard of the wheelbarrow of FIG. 1.
Figure 2B:
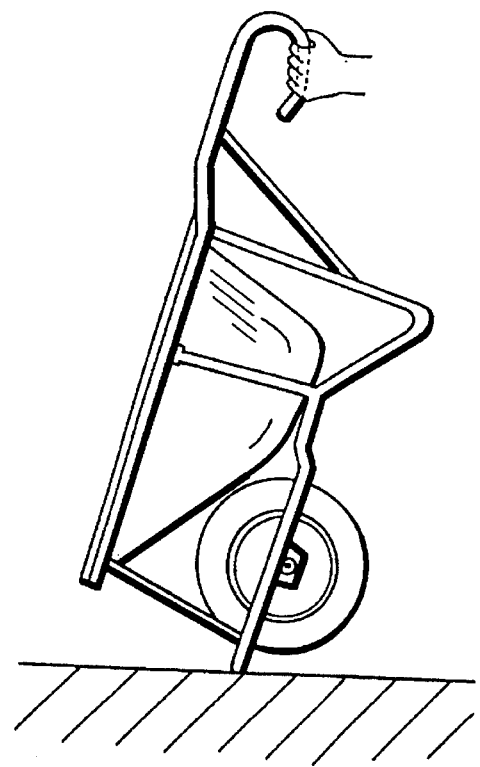

The worker slides his hands or handgrips backward on the First grips 51 as he lifts the handles 4 gradually, and holds the second grips 52 through the round grip portions 53 as shown in FIGS. 2(a) and 2(b) without leaving his hands from the handlegrips 5 or switching his handgrips from downward holding to upward holding.

Figure 3:
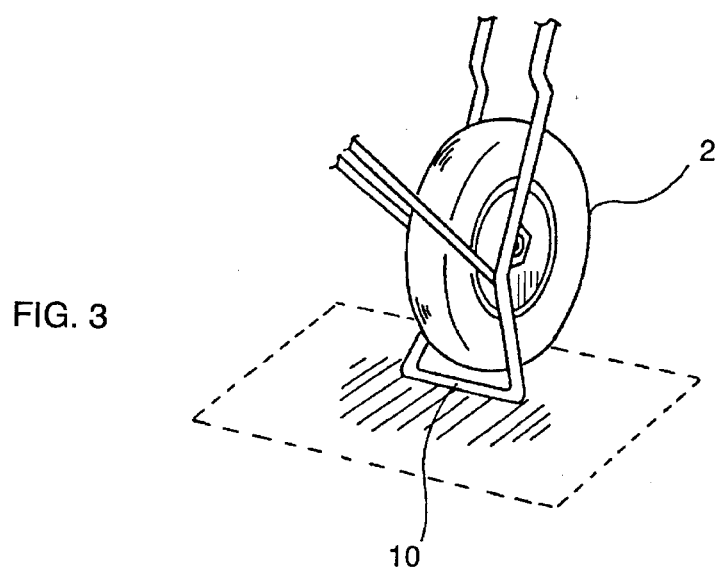
FIG. 3 is a partial perspective view showing the work of the front guard of the wheelbarrow of FIG. 1 in detail.

The wheelbarrow 1 will be kept stably on the front guard 10 while it is held in balance by the worker (not shown) as shown in FIG. 3 in more detail since the front guard 10 having a straight portion contacts a length of the ground. Thus the forward dumping using this wheelbarrow 1 will be stabler and safer.

The wheelbarrow 1 standing head down on the front guard 10 will be shaken and/or vibrated or rocked back and forth by the worker so that no load will remain in the tray 3. During such rocking, the wheelbarrow 1 will be effectively held from slanting sideways.

Figure 4A:
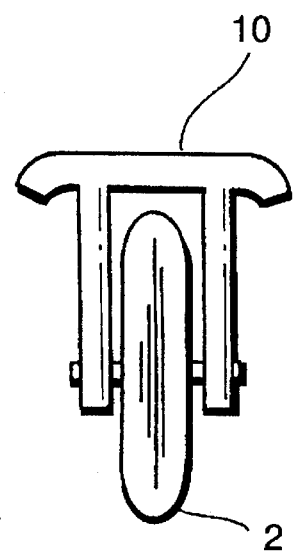
FIGS. 4(a), 4(b) and 4(c) show alternative designs of the front guard.
Figure 4B:
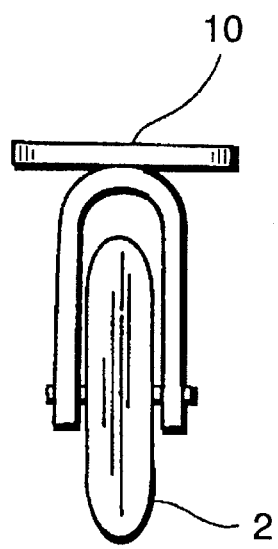
Figure 4C:
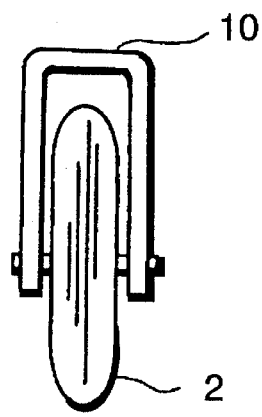

In FIGS. 4(a), 4(b) and 4(c), some alternative front guards 10 are shown. All of these front guards 10 have a considerable straight portion and provide a sidewardly stable holding of the wheelbarrows 1 during forward dumping operations.

The handles 4 of the wheelbarrow 1 are each provided with a roundish handlegrip 5 including a first grip 51, second grip 52, round grip portion 53 and stopper 54. The second grip 52 is provided below the first grip 51. A worker (not shown) holds the second grips 52 with his palms facing toward the first grips 51 during a forward dumping operation. The stoppers 54 prevent the hands from slipping off the handlegrips 5 accidentally.

Forward dumping operations using such a wheelbarrow 1 will be still safer and easier because the worker need not switch or leave his grips from the handlegrips 5 during forward dumping operations.

Figure 5:
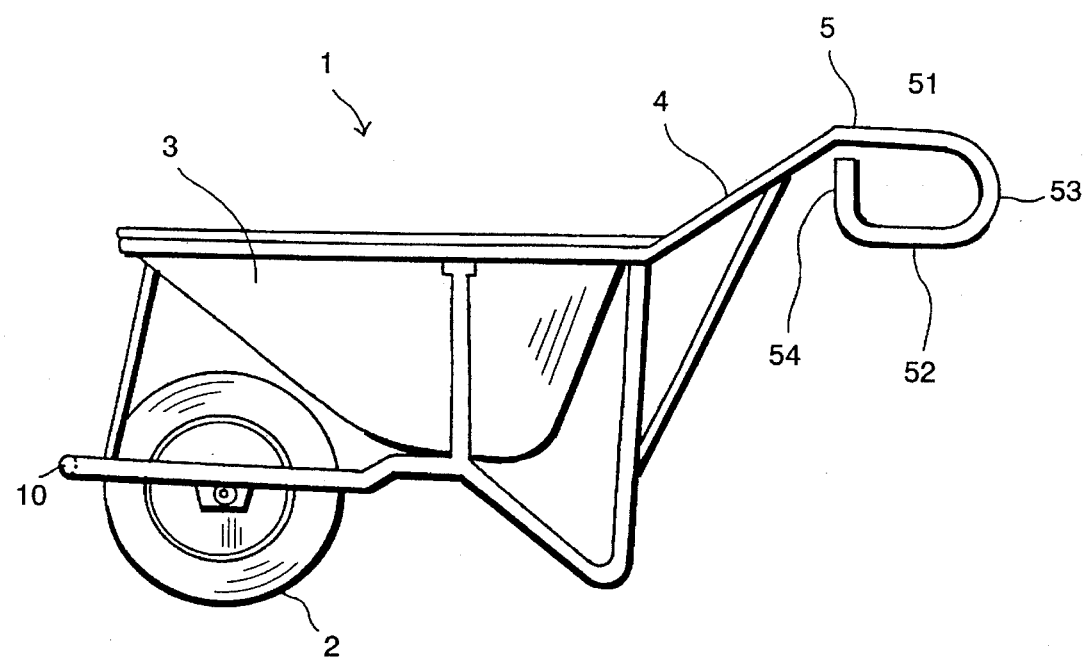
FIG. 5 is a side elevational view of a wheelbarrow further having a rounded or roundish handlegrip according to the present invention.

FIG. 5 shows a wheelbarrow 1 having handles 4 each with an alternative roundish handlegrip 5 whose stopper 54 extends nearer to the handlegrip 5, the roundish handlegrip 5 almost forming a loop.

The hands of a worker (not shown) holding the first grips 51 slide rearward gradually during a forward dumping operation and come to the second grips 52 provided below the first grips 51 through the round grip portions 53. The palms (not shown) on the second grips 52 are to face upward or toward the first grips 51. The hands on the second grips 52 will be more effectively prevented from slipping off by the stoppers 54 which extend longer. It is easier and safer compared with the case of a conventional wheelbarrow to lift the handles 4 utilizing such roundish handlegrips 5.

Figure 6:
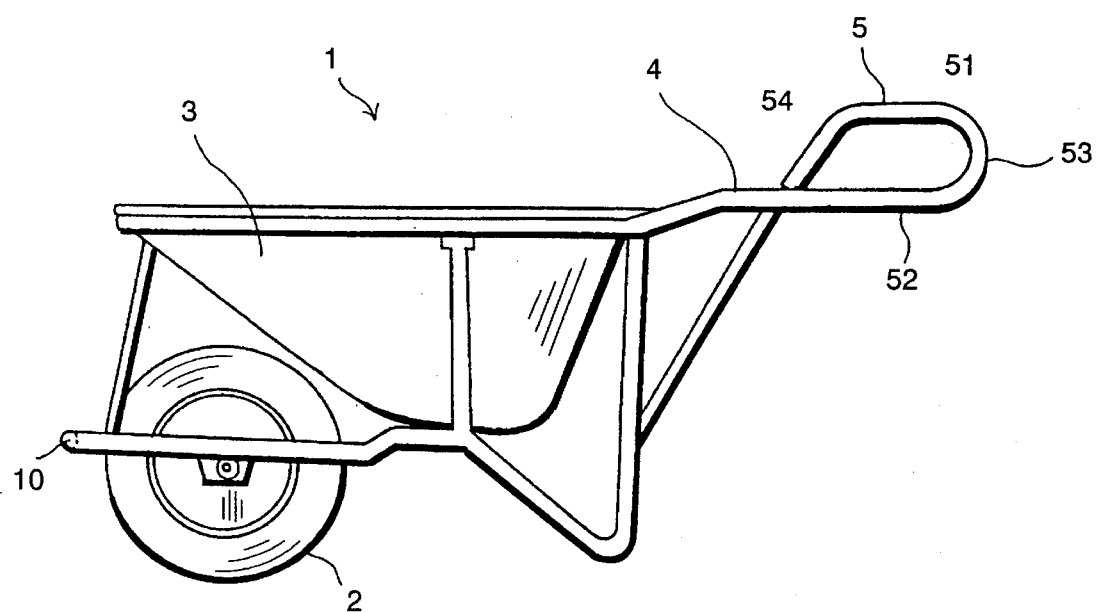
FIG. 6 shows another embodiment of the roundish handlegrip.

FIG. 6 shows another example of the roundish handlegrip 5. In this embodiment, the first grip 51 is an extended and bent portion of the handlegrip 5. The round grip portion 53 is located between the first grip 51 above and the second grip 52 below. A worker (not shown) holds the first grips 51 when he pushes the wheelbarrow 1 forward. He utilizes the second grips 52 when he dumps the load in the tray 3 forward. The stopper 54 touches the handle 4 in this embodiment and the roundish handlegrip 5 forms a closed loop.

Figure 7A:
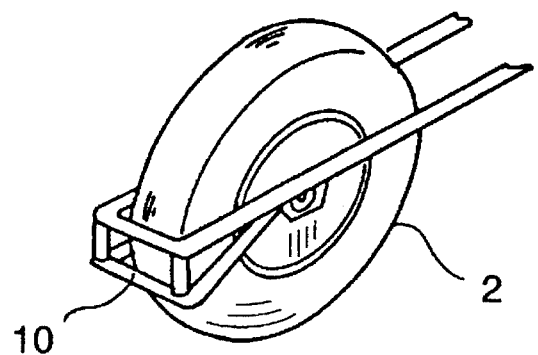
FIGS. 7(a) and 7(b) show another embodiment of the front guard in partial perspective and side elevational view.
Figure 7B:
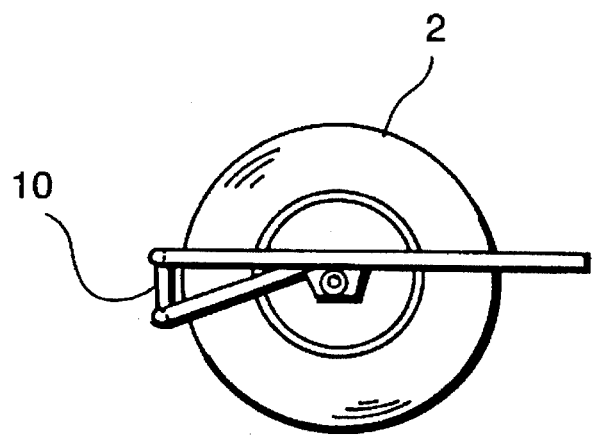

FIGS. 7(a) and 7(b) show another embodiment of the front guard 10. The front guard 10 in this embodiment comprises two horizontal bars connected at their respective ends with two short vertical bars as clearly shown in FIG. 7(a). The "vertical" direction is the direction vertical to the wheel axis. The wheelbarrow 1 will be held more stably when it stands head down on the front guard 10 since the front guard 10 contacts an area of the ground. The lower horizontal bar of the front guard touches the ground first as the handles 4 are lifted.

Figure 8A:
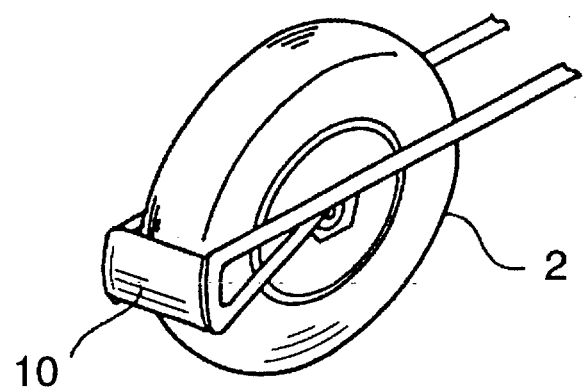
FIGS. 8(a) and 8(b) show another embodiment of the front guard in partial perspective and side elevational view.
Figure 8B:
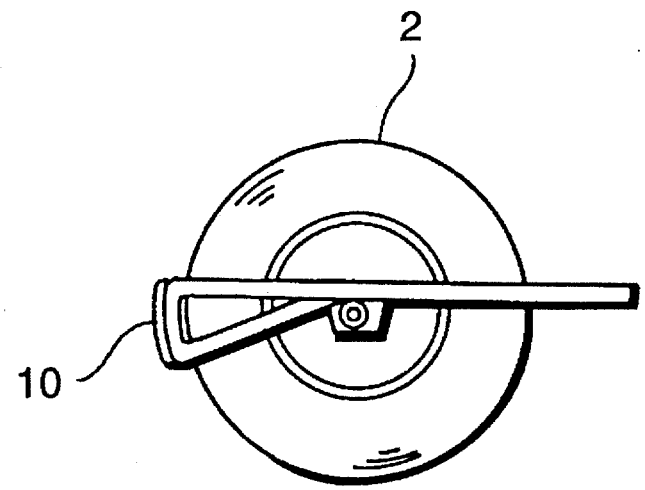

FIGS. 8(a) and 8(b) show still another example of the front guard 10. In this embodiment, the front guard 10 is provided with a curved plate instead of a horizontal bar or bars. This type of front guard 10 will provide an easier back-forth rocking of the wheelbarrow 1 during forward dumping operations compared with the wheelbarrow 1 having the front guard 10 of FIGS. 7(a) and 7(b).

Figure 9:
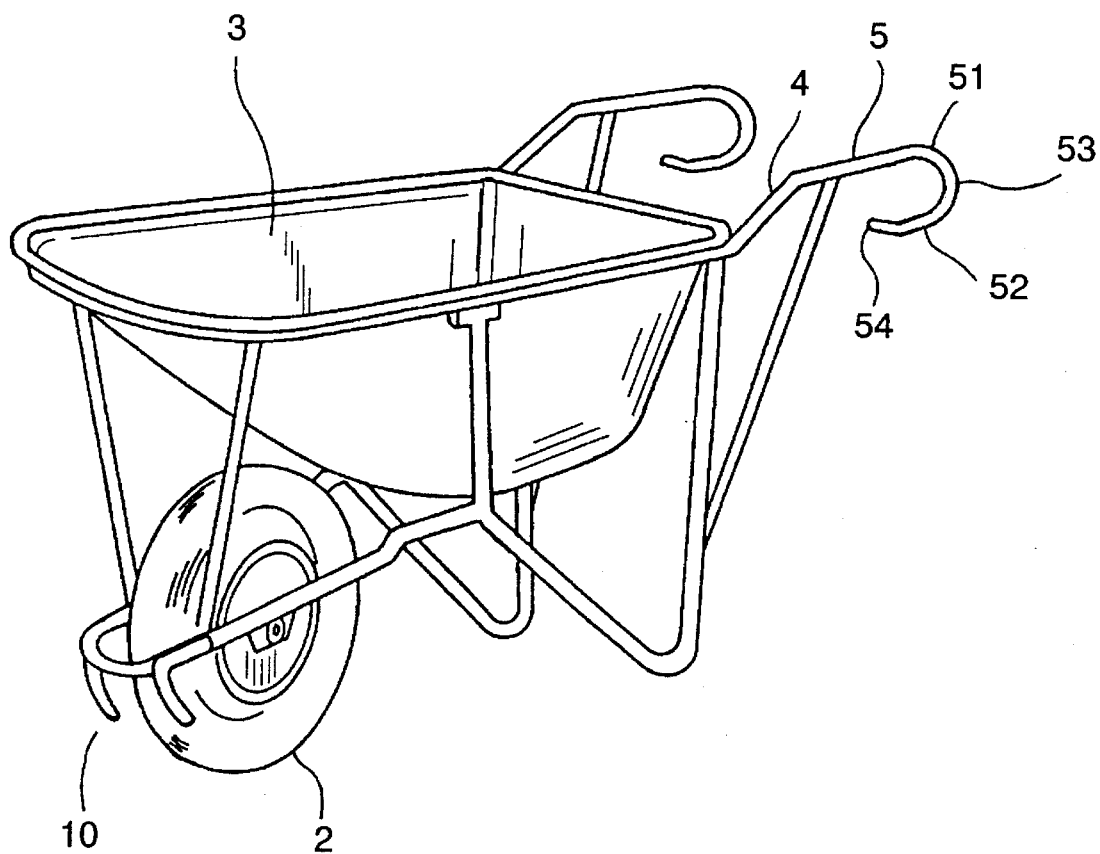
FIG. 9 is a perspective view of a wheelbarrow having another alternative front guard.

The wheelbarrow 1 of FIG. 9 is still another example of the present invention, having a front guard 10 including a roundish front bar and two downwardly extending rounded or roundish bars provided on both sides of the wheel 2.

Figure 10A:
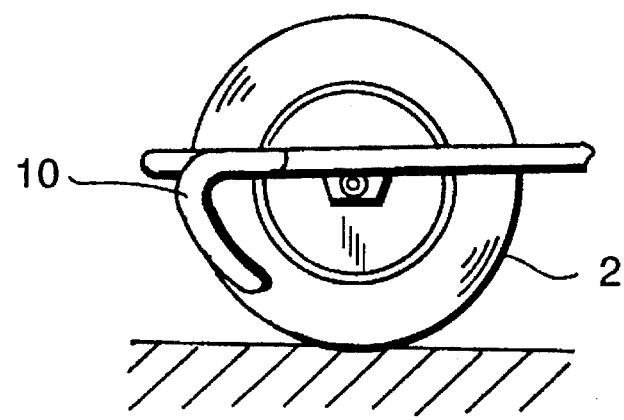
FIGS. 10(a), 10(b) and 10(c) are side elevational views showing the work of the front guard of the wheelbarrow of FIG. 9 in succession.
Figure 10B:
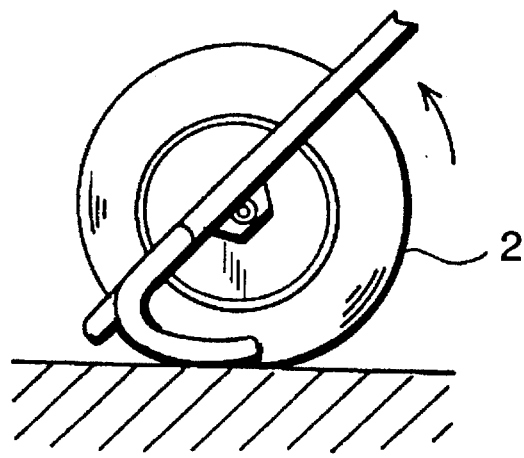
Figure 10C:
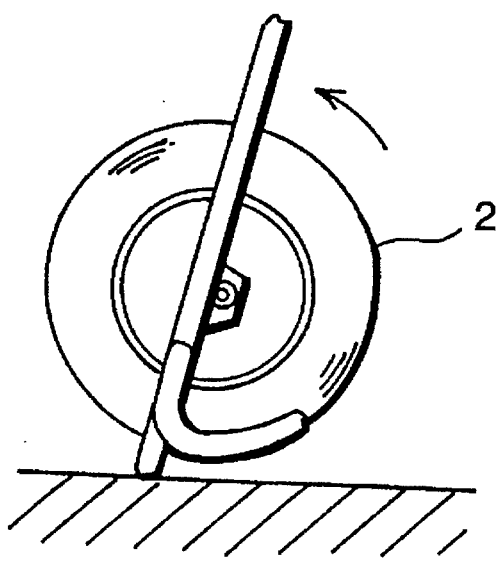

The downwardly extending rounded bars are bent along the circumference of the wheel 2 as shown in FIG. 9. The work of this type of the front guard 10 is nearly identical with that of the front guard 10 of FIGS. 8(a) and 8(b), which is shown in detail in FIGS. 10(a), 10(b) and 10(c) in succession.

Figure 11A:
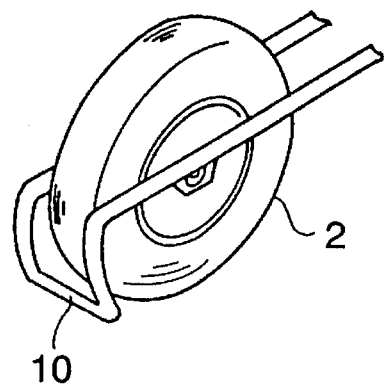
FIGS. 11(a) and 11(b) show another embodiment of the front guard in partial perspective and side elevational view.
Figure 11B:
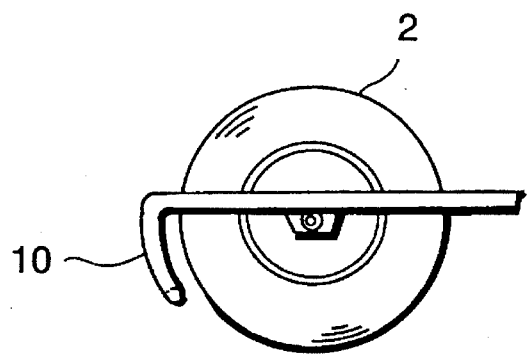

FIGS. 11(a) and 11(b) show yet another example of the front guard 10. This type of front guard 10 also works nearly identically with the front guards 10 shown in FIGS. 8 and 9.

Figure 12:
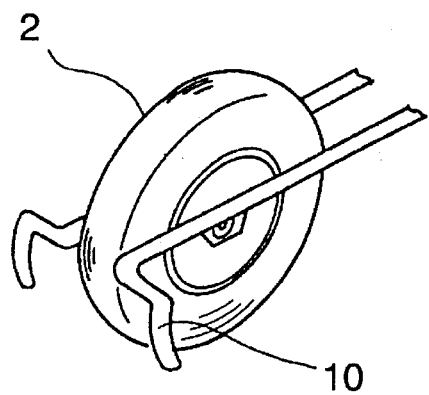
FIG. 12 shows still another embodiment of the front guard.

FIG. 12 shows yet another modification of the front guard 10, which contacts a wider length of the ground, thus more stable sidewardly than the front guards 10 of FIGS. 8, 9 and 11.

Figure 13A:
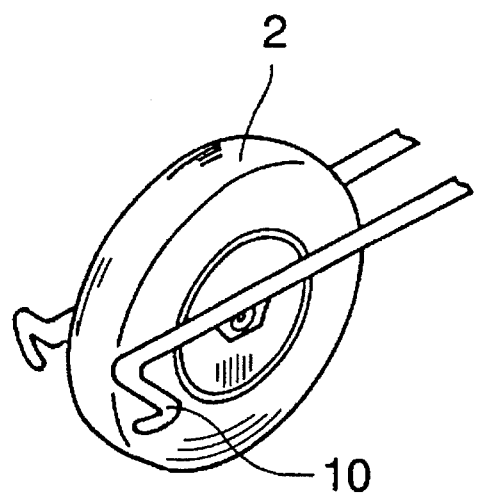
FIGS. 13(a), 13(b) and 13(c) show yet another embodiment of the front guard in partial perspective, side elevational and front view.
Figure 13B:
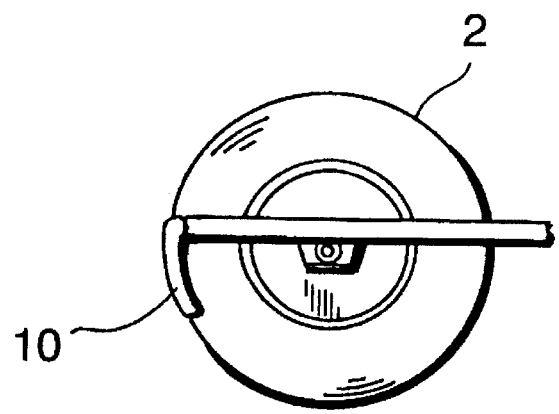
Figure 13C:
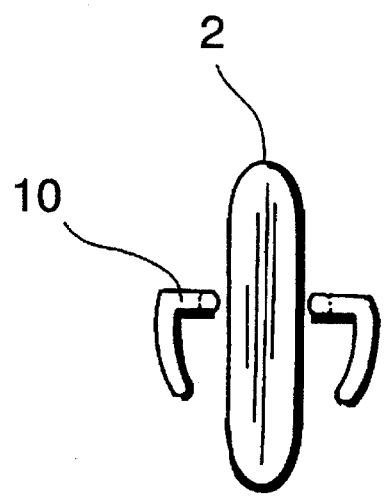

FIGS. 13(a), 13(b) and 13(c) show a front guard 10 which is a slightly modified version of the front guard 10 of FIG. 12, in that the lower portion of the front guard 10 contacts a shorter length of the ground for easier utilization.

Figure 14:
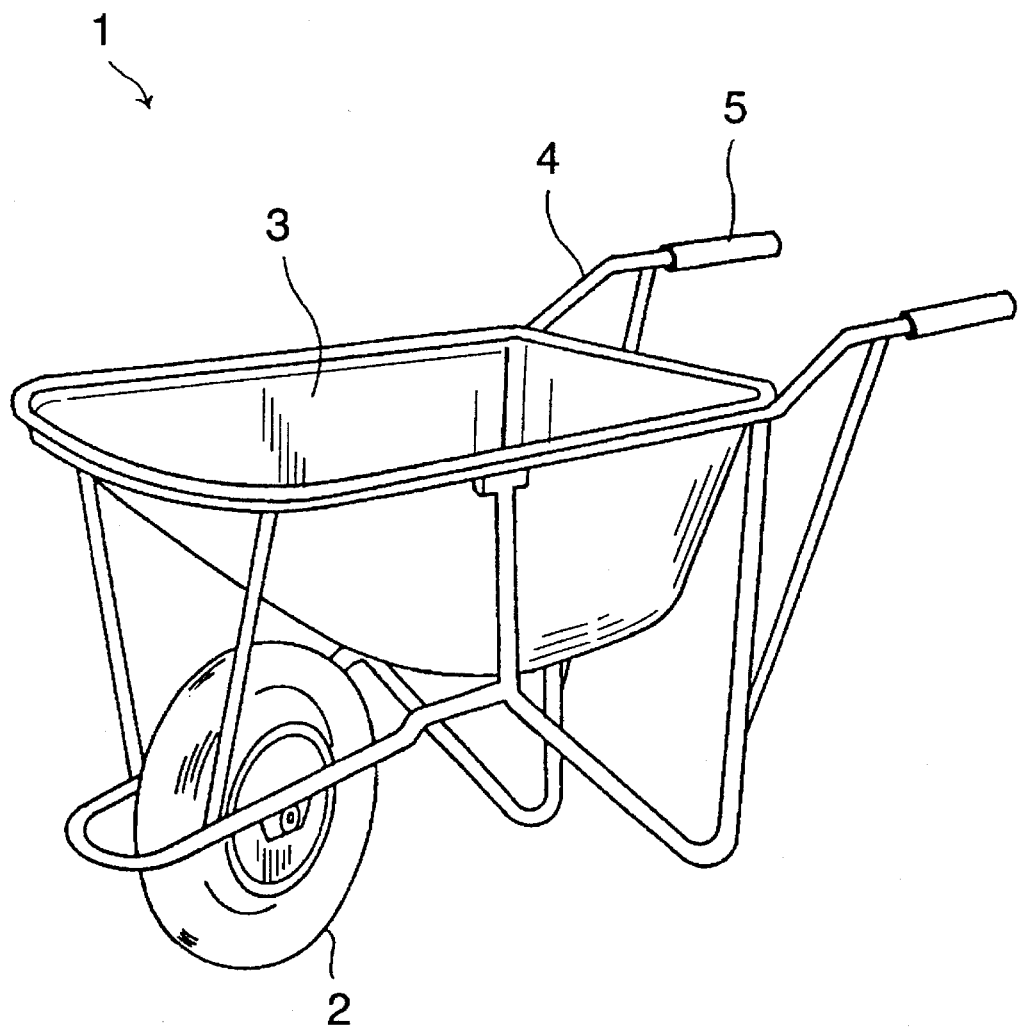
FIG. 14 is a perspective view of a conventional wheelbarrow.

The wheelbarrow 1 shown in FIG. 14 is a conventional wheelbarrow 1 including a pair of handles each having a straight handlegrip 5 and a roundish front wheel guard. A worker will have a considerable difficulty in a forward dumping operation using such a conventional wheelbarrow 1 since the handlegrips 5 are straight, requiring switching of handgrips. The roundish front wheel guard will not provide a stably holding of the wheelbarrow 1 in good balance during forward dumping operations when the load (not shown) in the tray 3 is heavy or the worker is not skilled enough or strong enough.

Other modifications of the forgoing embodiment wheelbarrows having a front guard of the present invention and roundish handlegrips may be easily conceived by an ordinary person skilled in the art, however, all such modifications are intended to fall within the scope of the appended claims.

What is claimed is:

1. A wheelbarrow comprising a wheel, a tray, a pair of handles, and a front guard, wherein each of said handles include a roundish handlegrip for facilitating smooth roundish movement of a handgrip thereon in forward dumping operation, each of said handles comprising a first grip, a second grip below said first grip, and a round grip portion provided at a rear end thereof connecting said first grip and said second grip, and wherein said front guard is provided in front of said wheel and includes a pair of round bar portions extending a length substantially downwardly and partially along the circumference of said wheel, such that at least a lower end of each of said round bar portions can contact a surface upon which said wheelbarrow rests to stably support said wheelbarrow so that said wheelbarrow may be rocked back and forth stably and smoothly in a head down position on said round bar portions in a forward dumping operation.

2. A wheelbarrow according to claim 1, wherein said roundish handlegrip further comprises a stopper provided at a forward end of said second grip.

* * * * *